L. F. BRASCH.
BOX COVER.
APPLICATION FILED SEPT. 14, 1910.
1,094,833.
Patented Apr. 28, 1914.
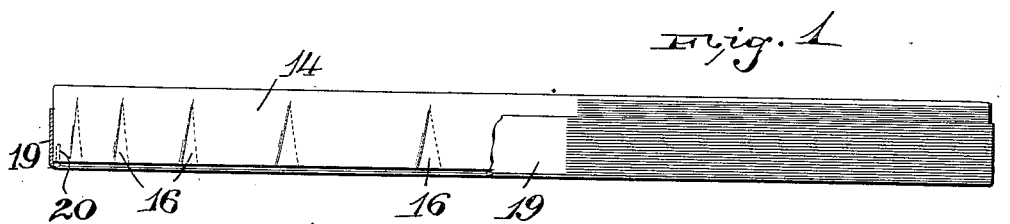
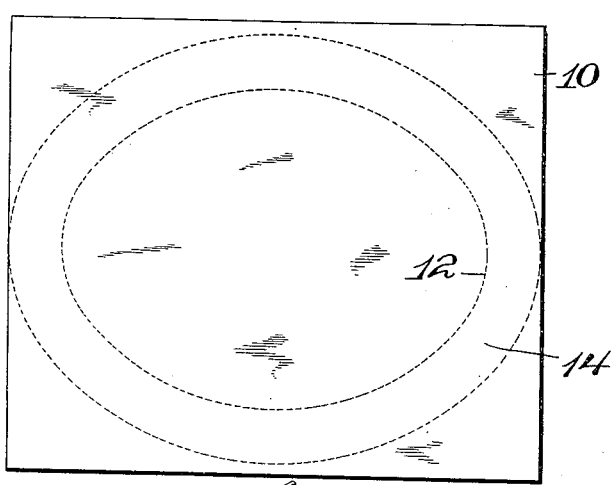
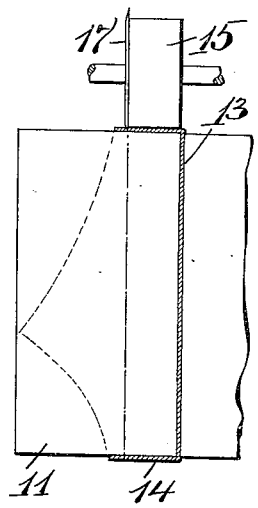
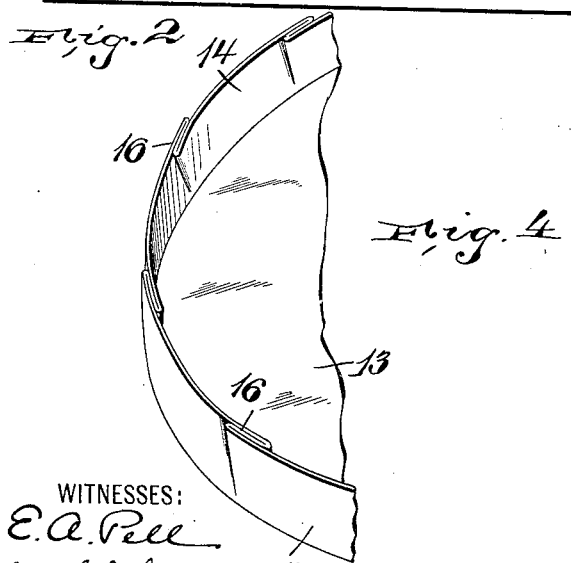
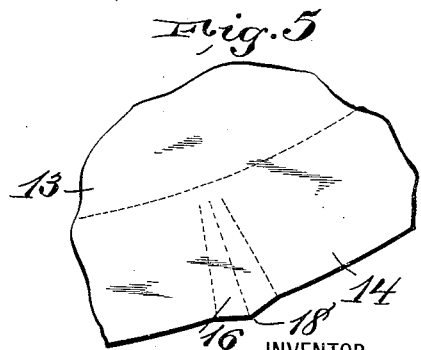

UNITED STATES PATENT OFFICE.

LOUIS F. BRASCH, OF NEWARK, NEW JERSEY.

BOX-COVER.

1,094,833.  Specification of Letters Patent.  Patented Apr. 28, 1914.

Application filed September 14, 1910. Serial No. 581,956.

*To all whom it may concern:*

Be it known that I, LOUIS F. BRASCH, a citizen of the United States, residing at Newark, in the county of Essex and State of New Jersey, have invented certain new and useful Improvements in Box-Covers; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to an improved box-end, and is designed to provide a bottom and a lid for a box, which bottom or lid is made of one piece of material, preferably cardboard.

The defect in the lid or bottom, made up of an end piece and a rim pasted together, is that when the boxes are stacked in shipment the end pieces come away from the paste and the goods are crushed or flattened, by reason of their being caused to bear the weight of the boxes resting on them.

The present invention provides a one piece box-end which has a stiffened edge, by reason of the material being folded over on itself at the edge. If desired a strip can be pasted over the rim or edge of the cover to give it a better finish.

The invention is illustrated in the accompanying drawings, in which—

Figure 1 is a side view of a box-end with the edge strip partly broken away. Fig. 2 is a plan view of the blank used in making the cover, and Fig. 3 illustrates the manner of making the box-end. Fig. 4 is a perspective view, enlarged, of a portion of a box-end without the edge strip. Fig. 5 is a plan view of a part of the rim or edge of a box-end flattened out to more clearly show the fold.

I make the box-end out of a blank 10, which is placed over a block 11, which is of the same size and outline of the box-end which it is desired to make. The shape of the box-end can be of any kind but I have illustrated an elliptical one, in the application, having an outline shown by a dotted line 12 in Fig. 2. This forms an end-piece 13 on the box-end, and the rim 14 is then folded down over the sides of the block as in Fig. 3, this being in any manner, but preferably by rolling with a roller 15 to cause the rim to lie flat on the block. The excess material on the rim is caused to overlap or form folds or plaits 16, shown more particularly in Figs. 1 and 4. These folds or plaits are arranged regularly around the edge of the rim, and stiffen the edge, causing it to hold its shape. When these folds or plaits are formed, the edge is cut off, preferably by a knife 17 shown in Fig. 3, and this knife can be fixed, if desired, on the roller 15. These folds when flattened out appear as in Fig. 5, with the projecting part 18, which illustrates the advantage of first folding and then cutting the edge, because if the edge was cut first and then folded, it would require a die to cut out the projection 18 for each fold. A strip 19 with a turned-over end 20 can be pasted over the edge of the rim 14, if desired, to give it a better finish, and also insure the close holding of the folds 16. The rim when folded over from the end-piece and when folded at random around its edge, bends over for part of the distance from the end-piece without being folded so that the folds in the rim terminate short of the juncture of the rim and the end-piece, permitting a close fitting of the box-end adjacent to the end-piece and a box on which it is placed.

Having thus described my invention, what I claim is:—

A box-end formed of a single blank of stiff material devoid of scoring, the blank having an excess of material required for the box-end, the blank being formed into an end piece and a downwardly bent narrow rim, the end piece and rim having a sharply turned juncture the rim being folded successively and at random into closely lying folds to form a substantially perpendicular rim, the folds extending from the edge of the rim toward the end piece, but terminating short of the juncture of the rim and the end piece, the edge being cut along the folds to give symmetry to the edge.

In testimony that I claim the foregoing, I have hereunto set my hand this 6th day of September 1910.

LOUIS F. BRASCH.

Witnesses:
E. A. PELL,
A. C. TEANY.

Copies of this patent may be obtained for five cents each, by addressing the "Commissioner of Patents, Washington, D. C."